(12) United States Patent
Hamada

(10) Patent No.: US 10,258,961 B2
(45) Date of Patent: Apr. 16, 2019

(54) REACTOR

(71) Applicant: IHI CORPORATION, Tokyo (JP)

(72) Inventor: Koki Hamada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/361,848

(22) Filed: Nov. 28, 2016

(65) Prior Publication Data

US 2017/0072379 A1    Mar. 16, 2017

Related U.S. Application Data

(63) Continuation of application No. PCT/JP2015/074177, filed on Aug. 27, 2015.

(30) Foreign Application Priority Data

Aug. 29, 2014    (JP) ................... 2014-175971

(51) Int. Cl.
  *B01J 16/00*    (2006.01)
  *B01J 19/00*    (2006.01)
  (Continued)

(52) U.S. Cl.
  CPC ............ *B01J 19/249* (2013.01); *B01D 53/88* (2013.01); *B01J 16/005* (2013.01);
  (Continued)

(58) Field of Classification Search
  CPC ........ B01D 53/00; B01D 53/34; B01D 53/74; B01D 53/86; B01D 53/88; B01J 16/00;
  (Continued)

(56) References Cited

U.S. PATENT DOCUMENTS 5,518,827 A * 5/1996 Matsumura ......... H01M 8/0612
                                                429/424
9,737,869 B2    8/2017 Kamata et al.
(Continued)

FOREIGN PATENT DOCUMENTS

EP    1 231 446 A2    8/2002
EP    1 348 484 A2    10/2003
(Continued)

OTHER PUBLICATIONS

Machine translation of JP 2007-290900 A, published Nov. 8, 2007. (Year: 2007).*

(Continued)

*Primary Examiner* — Natasha E Young

(57) ABSTRACT

A reactor includes a plurality of reaction side flow passages through which a reaction fluid flows, a catalyst (catalyst structure) disposed inside the reaction side flow passages to accelerate the reaction of the reaction fluid, a plurality of heat medium side flow passages which are alternately stacked with the reaction side flow passages, and through which a heat medium flows, and a suppression flow passage which is disposed adjacent to a surface of the reaction side flow passage, the heat medium side flow passages being not stacked on the surface, and through which flows a suppression fluid suppressing the heat dissipation to the outside from the reaction fluid flowing through the reaction side flow passage, or the heat transfer from the outside to the reaction fluid.

8 Claims, 4 Drawing Sheets

(51) Int. Cl.
*B01J 19/24* (2006.01)
*B01D 53/88* (2006.01)
*F28F 3/08* (2006.01)
*F28F 9/02* (2006.01)
*F28F 13/12* (2006.01)
*F28D 9/00* (2006.01)
*F28F 3/02* (2006.01)
*F28F 13/06* (2006.01)
*F28D 21/00* (2006.01)

(52) U.S. Cl.
CPC ............ *B01J 19/0013* (2013.01); *B01J 19/24* (2013.01); *F28D 9/0062* (2013.01); *F28F 3/02* (2013.01); *F28F 3/025* (2013.01); *F28F 3/08* (2013.01); *F28F 9/0224* (2013.01); *F28F 13/06* (2013.01); *F28F 13/12* (2013.01); *B01J 2219/00076* (2013.01); *B01J 2219/2462* (2013.01); *F28D 2021/0022* (2013.01); *F28F 2250/04* (2013.01)

(58) Field of Classification Search
CPC ....... B01J 16/005; B01J 19/00–19/0013; B01J 19/24; B01J 19/248; B01J 19/249; B01J 2219/00049; B01J 2219/00051; B01J 2219/00074; B01J 2219/00076; B01J 2219/24; B01J 2219/2401; B01J 2219/245; B01J 2219/2461; B01J 2219/2462; F28D 9/00; F28F 3/00; F28F 3/02; F28F 3/025; F28F 3/08; F28F 9/00; F28F 9/02; F28F 9/0219; F28F 9/0224; F28F 13/00; F28F 13/06; F28F 13/12
See application file for complete search history.

(56) References Cited

U.S. PATENT DOCUMENTS

| | | |
|---|---|---|
| 2002/0104645 A1 | 8/2002 | Yoshida |
| 2004/0015451 A1 | 1/2004 | Sahota et al. |
| 2004/0101421 A1 | 5/2004 | Kenny et al. |
| 2004/0104010 A1 | 6/2004 | Kenny et al. |
| 2004/0104022 A1 | 6/2004 | Kenny et al. |
| 2004/0112571 A1 | 6/2004 | Kenny et al. |
| 2004/0112585 A1 | 6/2004 | Goodson et al. |
| 2004/0148959 A1 | 8/2004 | Munch et al. |
| 2004/0182548 A1 | 9/2004 | Lovette et al. |
| 2004/0182551 A1 | 9/2004 | Zhou et al. |
| 2004/0182560 A1 | 9/2004 | Kenny et al. |
| 2004/0188064 A1 | 9/2004 | Upadhya et al. |
| 2004/0188065 A1 | 9/2004 | Shook |
| 2004/0188066 A1 | 9/2004 | Upadhya et al. |
| 2004/0206477 A1 | 10/2004 | Kenny et al. |
| 2004/0233639 A1 | 11/2004 | Upadhya et al. |
| 2004/0234378 A1 | 11/2004 | Lovette et al. |
| 2004/0244950 A1 | 12/2004 | Zhou et al. |
| 2005/0042110 A1 | 2/2005 | Corbin et al. |
| 2005/0084385 A1 | 4/2005 | Corbin et al. |
| 2005/0183443 A1 | 8/2005 | Munch et al. |
| 2005/0183444 A1 | 8/2005 | Munch et al. |
| 2005/0183445 A1 | 8/2005 | Munch et al. |
| 2005/0183845 A1 | 8/2005 | Munch et al. |
| 2005/0210913 A1 | 9/2005 | Munch et al. |
| 2005/0211417 A1 | 9/2005 | Upadhya et al. |
| 2005/0211418 A1 | 9/2005 | Kenny et al. |
| 2005/0211427 A1 | 9/2005 | Kenny et al. |
| 2005/0268626 A1 | 12/2005 | Upadhya et al. |
| 2005/0269061 A1 | 12/2005 | Brewer et al. |
| 2005/0269691 A1 | 12/2005 | Munch |
| 2005/0270742 A1 | 12/2005 | Brewer et al. |
| 2006/0169445 A1 | 8/2006 | Sato et al. |
| 2007/0034356 A1 | 2/2007 | Kenny et al. |
| 2007/0193732 A1 | 8/2007 | Oofune |
| 2007/0211431 A1 | 9/2007 | Munch |
| 2007/0256815 A1 | 11/2007 | Conway et al. |
| 2007/0256825 A1 | 11/2007 | Conway et al. |
| 2008/0210405 A1 | 9/2008 | Datta et al. |
| 2009/0044928 A1 | 2/2009 | Upadhya et al. |

FOREIGN PATENT DOCUMENTS

| | | |
|---|---|---|
| EP | 2 954 949 A1 | 12/2015 |
| JP | 2002-313384 A | 10/2002 |
| JP | 2003-279283 A | 10/2003 |
| JP | 2005-049066 A | 2/2005 |
| JP | 2007-007558 A | 1/2007 |
| JP | 2007290900 A * | 11/2007 |
| JP | 2008-530482 A | 8/2008 |
| JP | 4395342 B2 | 1/2010 |
| JP | 5076353 B2 | 9/2012 |
| WO | 2014/123152 A1 | 8/2014 |

OTHER PUBLICATIONS

European Patent Office, Extended European Search Report, issued in EP Patent Application No. EP15 836 552.8, which is a European counterpart of U.S. Appl. No. 15/361,848, dated Oct. 13, 2017, 8 pages.

European Patent Office, Office Communication issued in European Patent Application No. Ep 15 836 552_8, which is a European counterpart of U.S. Appl. U.S. Appl. No. 15/361,848, with an issuance date of Aug. 20, 2018, 8 pp.

Japan Patent Office, "Decision to Grant a Patent," issued in Japanese Patent Application No. 2014-175971, which is a JP counterpart of U.S. Appl. No. 15/361,848, dated Oct. 23, 2018, 3 pages.

* cited by examiner

REACTOR

CROSS REFERENCE TO RELATED APPLICATIONS

This application is a continuation application of International Application No. PCT/JP2015/074177, now WO 2016/031903, filed on Aug. 27, 2015, which claims priority to Japanese Patent Application No. 2014-175971, filed on Aug. 29, 2014, the entire contents of which are incorporated by reference herein.

BACKGROUND

1. Technical Field

The present disclosure relates to a reactor of heat exchange type.

2. Description of the Related Art

The reactor of heat exchange type includes a reaction side flow passage functioning as a reaction field, and a heat medium side flow passage disposed in parallel with the reaction side flow passage while having a heat transfer partition interposed therebetween. The reaction fluid flows through the reaction side flow passage, and the heat medium circulates through the heat medium side flow passage for heat exchange with the reaction fluid. The reaction may be efficiently performed in the reaction side flow passage of the heat exchange type reactor. As one of the above-described heat exchange type reactors, the stack type reactor has been developed, which is configured by stacking the reaction side flow passages and the heat medium side flow passages alternately (see Patent Japanese Patent No. 5076353).

SUMMARY

However, the generally employed stack type reactor is configured to expose the side surface of the reaction side flow passage to the outside, on which the heat medium side flow passage is not stacked. The heat dissipation may occur to the outside from the reaction side flow passage through the side surface, or heat inflow may occur from the outside into the reaction side flow passage through the side surface. As a result, the temperature around the side surface of the reaction side flow passage will deviate far from the temperature suitable for the reaction, thus deteriorating the reaction efficiency.

The present disclosure has been made in view of such conventional problems. It is an object of the present disclosure to provide the reactor capable of suppressing heat dissipation to the outside from the reaction side flow passage, or heat inflow from the outside to the reaction side flow passage so as to improve reaction efficiency.

A reactor according to an aspect of the present disclosure includes: a plurality of reaction side flow passages through which flows a reaction fluid that is a fluid to be a reaction object; a catalyst disposed inside the reaction side flow passage to accelerate reaction of the reaction fluid; a plurality of heat medium side flow passages which are alternately stacked with the reaction side flow passages and through which flows a heat medium that is a fluid performing heat exchange with the reaction fluid flowing through the reaction side flow passage; and a suppression flow passage which is disposed adjacent to a surface of the reaction side flow passage, the heat medium side flow passage being not stacked on the surface, and through which flows a suppression fluid that is a fluid suppressing heat dissipation from the reaction fluid flowing through the reaction side flow passage to the outside, or heat transfer from the outside to the reaction fluid.

The heat medium may flow, as the suppression fluid, through the suppression flow passage.

The reactor may further include a communication part which allows the heat medium side flow passage and the suppression flow passage to communicate with each other. The heat medium may be introduced into the suppression flow passage from the heat medium side flow passage through the communication part.

According to the present disclosure, it is possible to suppress heat dissipation from the reaction side flow passage to the outside, or heat inflow from the outside to the reaction side flow passage, and to improve reaction efficiency.

DESCRIPTION OF THE EMBODIMENTS

Figure 1A:
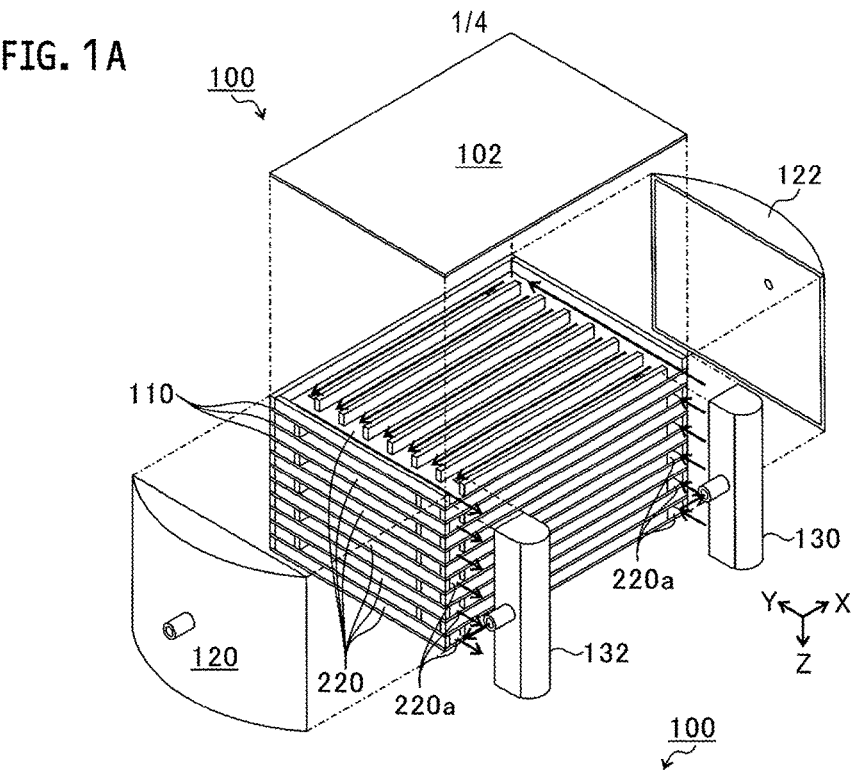
FIGS. 1A and 1B are explanatory views with respect to a reactor.

Hereinafter, an embodiment according to the present disclosure will be described in detail referring to accompanying drawings. The dimension, material, and any other specific values described in the embodiment are mere examples for easy understanding of the disclosure, and are never intended to restrict the present disclosure unless otherwise specified herein. Note that, in the specification and the drawings, the components with substantially the same functions and structures will be designated with the same codes, and overlapped explanations thereof will be omitted. The components which are not directly related to the present disclosure will also be omitted in the drawings.

FIG. 1 is an explanatory view of a reactor 100 according to this embodiment. FIG. 2 is a view explaining a reaction side flow passage 210 and a heat medium side flow passage 220. In this embodiment, X-axis, Y-axis, and Z-axis mutually crossing at right angles are defined as shown in FIGS. 1 and 2. Further, offset fins 300 and catalyst structures 400 are omitted in FIG. 1 for easy understanding.

Referring to FIG. 1, the reactor 100 is configured by stacking a plurality of heat transfer partitions 110 spaced at predetermined intervals. Further, the metal material (for example, heat-resistant metal such as stainless steel (SUS, and the like), nickel (Ni) based alloy (Inconel®, Hastelloy®, Haynes®)) is used for forming a top plate 102, the heat transfer partitions 110 (there is also a case shown by 110$a$ or 110$b$), a reaction fluid introduction member 120, a reaction fluid discharge member 122, a heat medium introduction member 130, and a heat medium discharge member 132, which constitute the reactor 100.

In manufacturing the reactor 100, the heat transfer partitions 110 are stacked and bonded with each other, and the top plate 102 is bonded to the uppermost heat transfer partition 110. Then, the stacked heat transfer partitions 110 are bonded to the reaction fluid introduction member 120, the reaction fluid discharge member 122, the heat medium introduction member 130, and the heat medium discharge member 132, respectively. Although the bonding method employed for manufacturing the reactor 100 is not restricted, TIG (Tungsten Inert Gas) welding or diffusion bonding is available, for example.

Figure 1B:
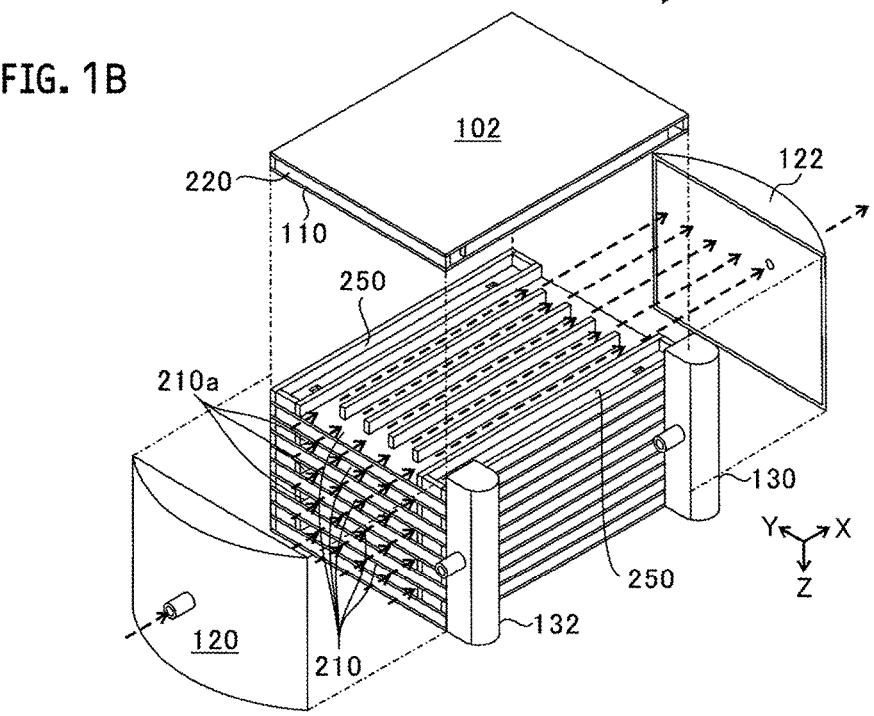

Here, of spaces partitioned by the heat transfer partitions 110, as shown in FIG. 1B, the spaces communicating with the reaction fluid introduction member 120 and the reaction fluid discharge member 122 via holes 210a formed on the sides of the reaction fluid introduction member 120 and the reaction fluid discharge member 122 serve as the reaction side flow passages 210. Further, of the spaces partitioned by the heat transfer partitions 110, as shown in FIG. 1A, the spaces communicating with the heat medium introduction member 130 and the heat medium discharge member 132 via holes 220a formed on the sides of the heat medium introduction member 130 and the heat medium discharge member 132 serve as the heat medium side flow passages 220. In other words, the reactor 100 according to this embodiment includes the reaction side flow passages 210 and the heat medium side flow passages 220 which are partitioned by the heat transfer partitions 110 while being arranged in parallel with one another, and has the reaction side flow passages 210 and the heat medium side flow passages 220 alternately stacked.

Figure 2A:
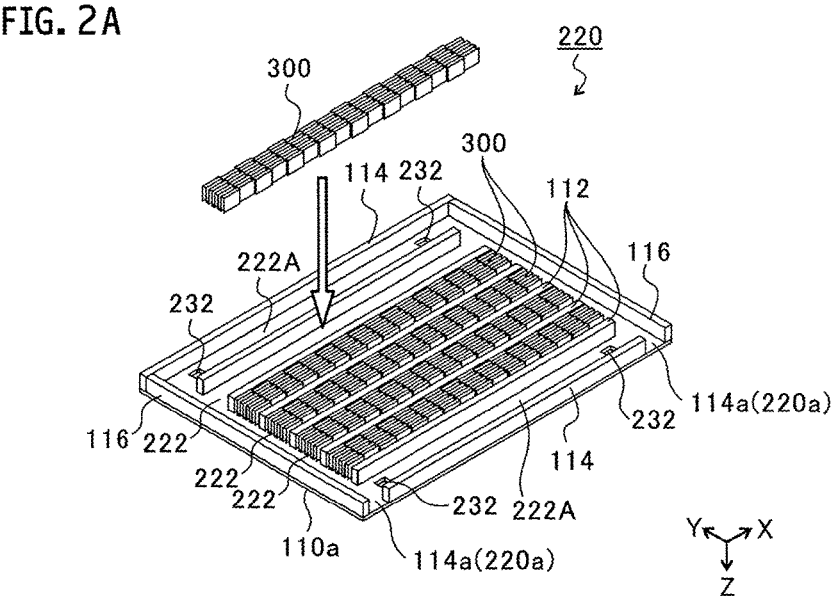
FIG. 2A is an explanatory view of a heat medium side flow passage.

As FIG. 2A shows, the heat transfer partition 110 (110a shown in FIG. 2A) serves as the bottom surface of the heat medium side flow passage 220. Further, the top plate 102 or the heat transfer partition 110 to be described later (110b shown in FIG. 2B) serves as the upper surface of the heat medium side flow passage 220. A plurality of ribs 112 is formed and erected on the heat transfer partition 110a for the purpose of retaining the gap between the heat transfer partitions 110a and 110b. Furthermore, the heat transfer partition 110a includes side walls 114 which form the side surfaces of the reactor 100, and side bars 116 erecting from the heat transfer partition for preventing mixture of the reaction fluid from the reaction fluid introduction member 120 and the reaction fluid discharge member 122. In other words, the heat medium side flow passage 220 is partitioned into a plurality of partition flow passages 222 which are arranged in parallel with one another in a direction orthogonal to the heat medium flowing direction.

As FIG. 2A shows, the side wall 114 at the side to which the heat medium introduction member 130 and the heat medium discharge member 132 are bonded has notched parts 114a. The notched parts 114a are designed to form the holes 220a (see FIG. 1) as the heat transfer partitions 110 are stacked. Then, the heat medium is introduced from the heat medium introduction member 130 into the heat medium side flow passage 220 via the holes 220a. Alternatively, the heat medium is discharged out of the heat medium side flow passage 220 to the heat medium discharge member 132 via the holes 220a.

Furthermore, as FIG. 2A shows, the partition flow passage 222 of the heat medium side flow passage 220 includes the metal offset fin 300 so as to stir the heat medium flowing through the partition flow passage 222 (the heat medium side flow passage 220). This makes it possible to improve heat exchange efficiency between the heat medium and the reaction fluid which flows through the reaction side flow passage 210.

Figure 2B:
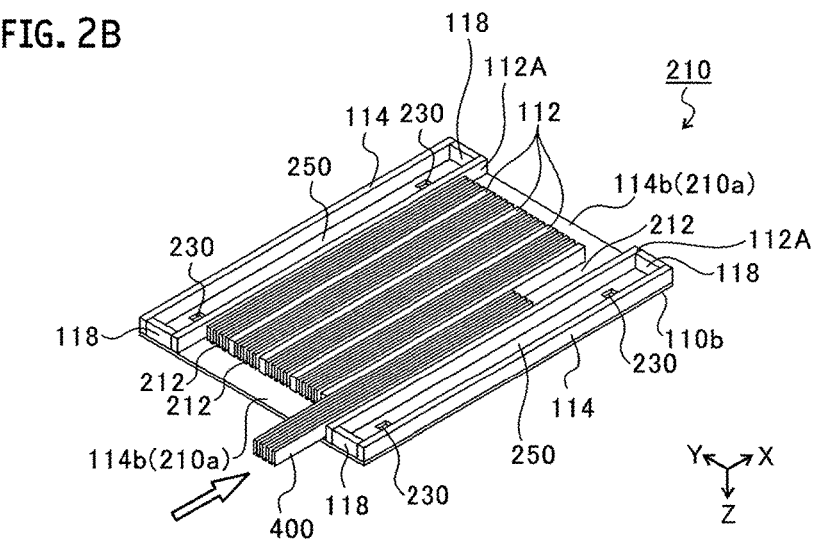
FIG. 2B is an explanatory view of a reaction side flow passage.

As FIG. 2B shows, the heat transfer partition 110b serves as the bottom surface of the reaction side flow passage 210. The heat transfer partition 110a (see FIG. 2A) serves as the upper surface of the reaction side flow passage 210. Like the heat transfer partition 110a as described above, the heat transfer partition 110b also includes a plurality of erected ribs 112 for retaining gaps between the heat transfer partitions 110 and the erected side walls 114. In other words, the reaction side flow passage 210 is partitioned by the ribs 112 into a plurality of partition flow passages 212 which are arranged in parallel with one another in a direction orthogonal to the reaction fluid flowing direction.

Note that, unlike the heat transfer partition 110a, the side bars 116 are not disposed on the heat transfer partition 110b. As a result, gaps 114b are formed between the two side walls 114. The gaps 114b are designed to form holes 210a (see FIG. 1) as the heat transfer partitions 110 are stacked. Then, the reaction fluid is introduced from the reaction fluid introduction member 120 into the reaction side flow passages 210 via the holes 210a. Alternatively, the reaction product is discharged out of the reaction side flow passages 210 to the reaction fluid discharge member 122 via the holes 210a.

Furthermore, the partition flow passage 212 which forms the reaction side flow passage 210 includes the catalyst structure 400 for accelerating reaction of the reaction fluid. The catalyst structure 400 is formed by fixing the catalyst supported on the carrier to the concavo-convex metal plate, that is, the corrugated metal plate. Here, the metal plate for constituting the catalyst structure 400 is made of the heat-resistant alloy which contains Fe (iron), Cr (chromium), Al (aluminium), and Y (yttrium) as main components, for example, Fecralloy®. Moreover, the carrier of the catalyst may be appropriately selected in accordance with the reaction in the reactor 100, which may be at least one selected from the group including $Al_2O_3$ (alumina), $TiO_2$ (titania), $ZrO_2$ (zirconia), $CeO_2$ (ceria), and $SiO_2$ (silica). In addition, the catalyst (active metal) is appropriately selected in accordance with the reaction in the reactor 100, for example, at least one selected from the group including Ni (nickel), Co (cobalt), Fe (iron), Pt (platinum), Ru (ruthenium), Rh (rhodium), and Pd (palladium).

Further, the heat transfer partition 110b includes bulkheads 118 each for connecting the outermost rib 112 (112A shown in FIG. 2) and the side wall 114. The bulkhead 118 forms the space (hereinafter referred to as a suppression flow passage 250) surrounded by the heat transfer partitions 110a, 110b, the rib 112A, the side wall 114, and the bulkhead 118. In other words, the suppression flow passage 250 is disposed adjacent to the surface of the reaction side flow passage 210, on which the heat medium side flow passage 220 is not stacked (the surface except the one on which the heat transfer partition 110 is disposed, that is, the rib 112A in this example). In other words, the suppression flow passages 250 are formed at both sides of the reaction side flow passage 210.

Furthermore, communication parts 230 each as a through hole are formed in the areas of the heat transfer partition 110b, which form the suppression flow passage 250. Moreover, communication parts 232 are formed in the areas of the heat transfer partition 110a, which constitutes the outermost partition flow passage 222 (222A shown in the drawing), that is, the upper surface of the suppression flow passage 250, which is formed as a result of stacking the heat transfer partitions 110. Functions of the suppression flow passage 250, and the communication parts 230 and 232 will be described in detail later.

This embodiment will be described returning to FIGS. 1A and 1B. As solid arrows in FIG. 1A indicate, the heat medium introduced from the heat medium introduction member 130 flows through the heat medium side flow passages 220, and is discharged from the heat medium discharge member 132. Further, as dashed arrows in FIG. 1B indicate, the reaction fluid (fluid to be reacted) introduced from the reaction fluid introduction member 120 flows through the reaction side flow passages 210, and is discharged from the reaction fluid discharge member 122. Here, as those drawings show, both the reaction fluid and the heat medium flow as countercurrents in this embodiment.

As described above, as the reaction side flow passages 210 and the heat medium side flow passages 220 are formed in parallel with one another while being partitioned by the heat transfer partitions 110, the heat medium which flows through the heat medium side flow passages 220 exchanges heat with the reaction fluid that flows through the reaction side flow passages 210 via the heat transfer partitions 110.

In the case of endothermic reaction in the reaction side flow passage 210, the heat medium side flow passage 220 and the heat medium supply heat to (heat) the reaction fluid that flows through the reaction side flow passage 210. In the case of exothermic reaction in the reaction side flow passage 210, the heat medium side flow passage 220 and the heat medium take heat from (cool) the reaction fluid that flows through the reaction side flow passage 210.

The endothermic reaction may be exemplified by the steam reforming reaction of methane as expressed by the chemical formula (1), and dry reforming reaction of methane as expressed by the chemical formula (2), as follows.

$$CH_4+H_2O \rightarrow 3H_2+CO \qquad \text{chemical formula (1)}$$

$$CH_4+CO_2 \rightarrow 2H_2+2CO \qquad \text{chemical formula (2)}$$

Further, the exothermic reaction may be exemplified by the shift reaction as expressed by the chemical formula (3), the methanation reaction as expressed by the chemical formula (4), and FT (Fischer Tropsch) synthesis reaction as expressed by the chemical formula (5), as follows.

$$CO+H_2O \rightarrow CO_2+H_2 \qquad \text{chemical formula (3)}$$

$$CO+3H_2 \rightarrow CH_4+H_2O \qquad \text{chemical formula (4)}$$

$$(2n+1)H_2+nCO \rightarrow C_nH_{2n+2}+nH_2O \qquad \text{chemical formula (5)}$$

As described above, the reaction side flow passages 210 and the heat medium side flow passages 220 are stacked for heat exchange between the reaction fluid and the heat medium so that the reaction efficiently proceeds in the reaction side flow passages 210. However, in the case where the surface of the reaction side flow passage 210, on which the heat medium side flow passage 220 is not stacked (for example, the side wall 114), is exposed to the outside (outside air), heat dissipation occurs out of the reaction side flow passage 210 to the outside. Alternatively, the heat inflow occurs from the outside into the reaction side flow passage 210.

Figure 3A:
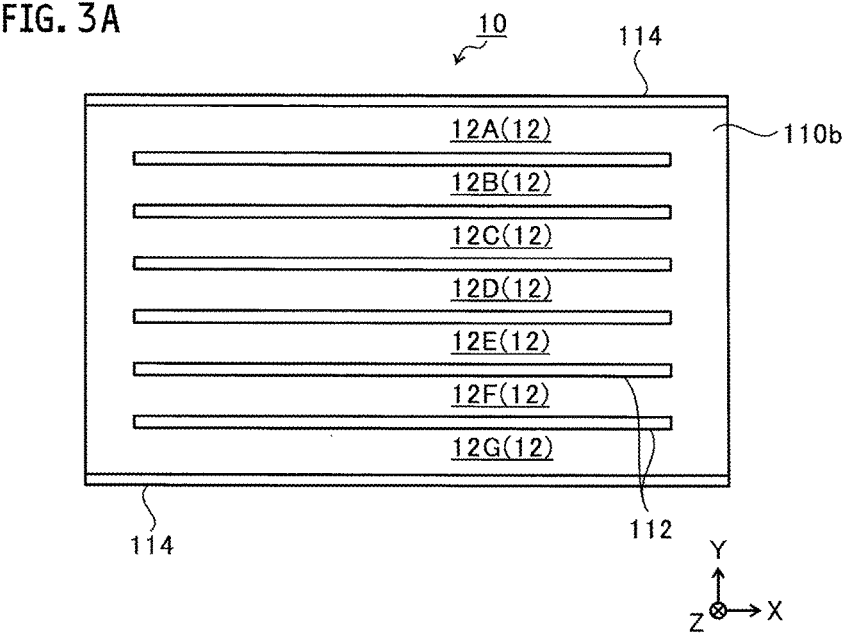
FIGS. 3A and 3B are explanatory views of heat dissipation from the reaction side flow passage to the outside.
Figure 3B:
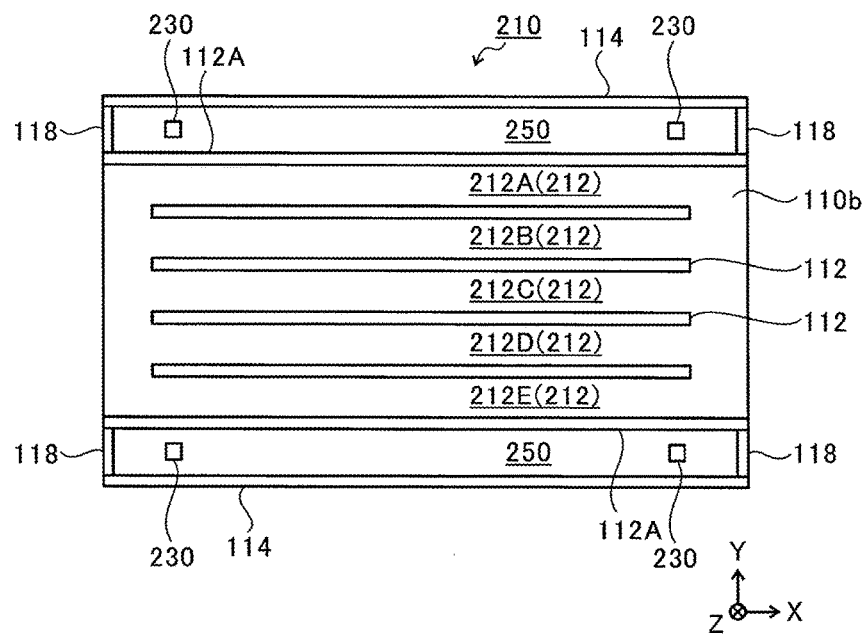

FIGS. 3A and 3B are top views of the heat transfer partition 110$b$, each explaining heat dissipation from the reaction side flow passage 210 to the outside as well as the suppression flow passages 250. Further, FIG. 3A is a view for explaining a reaction side flow passage 10 as a comparative example which does not include the suppression flow passage 250, and FIG. 3B is a view for explaining the reaction side flow passage 210 which includes the suppression flow passages 250 according to this embodiment. Note that, FIG. 3 omits showing the catalyst structure 400 for easy understanding. Furthermore, the following explanation may be exemplified by the case of endothermic reaction in the reaction side flow passage.

As FIG. 3A shows, the reaction side flow passage 10 as the comparative example includes a plurality of partition flow passages 12 extending along the X-axis. Among those partition flow passages 12, the partition flow passages 12A and 12G are disposed at the outermost positions along the Y-axis, which are partially partitioned by the side walls 114. In other words, the partition flow passages 12A and 12G are exposed to the outside air via the side walls 114. Meanwhile, the partition flow passages 12B to 12F between the partition flow passages 12A and 12G are exposed to the reaction fluid or the heat medium via the ribs 112 or the heat transfer partitions 110. Accordingly, heat is dissipated to the outside (outside air) from the reaction fluid which flows through the partition flow passages 12A and 12G, temperatures of which become lower than those of the partition flow passages 12B to 12F, resulting in deteriorated reaction efficiency.

Further, in the case where the reaction is performed in accordance with the chemical formulae (1) and (2) so that the reaction product has its volume (molar number) larger than the reaction fluid, for example, the reaction efficiency in the partition flow passages 12A and 12G will be lowered compared with the partition flow passages 12B to 12F. The resultant quantity of gas is lessened, thus reducing the pressure loss. In this case, the reaction fluid introduced into the reaction side flow passage 10 increasingly flows into the partition flow passages 12A and 12G more than the one flowing into the partition flow passages 12B to 12F. The reaction efficiency, thus, is further deteriorated.

On the contrary, as FIG. 3B shows, the reactor 100 according to this embodiment also includes a plurality of partition flow passages 212 along the X-axis. Among those partition flow passages 212, the partition flow passages 212A and 212O are disposed at the outermost positions along the Y-axis, having the partition flow passages 212B to 212D interposed therebetween. The suppression flow passages 250 are disposed each adjacent to the surface (rib 112A) of the reaction side flow passage 210, on which the heat medium side flow passages 220 are not stacked. The heat medium (suppression fluid) flows through the suppression flow passages 250, which exposes the reaction fluid flowing through the reaction side flow passage 210 to the heat medium via the rib 112A. This ensures to suppress the heat dissipation to the outside from the reaction side flow passage 210, or heat transfer to the reaction fluid from the outside. As a result, temperature drop around the outermost partition flow passages 212A and 212E may be prevented, thus suppressing deterioration in the reaction efficiency.

Further, it is possible to reduce the difference in the gas quantity (pressure loss) among the partition flow passages 212, which makes it possible to suppress deterioration in the reaction efficiency owing to the pressure loss difference.

Figure 4:
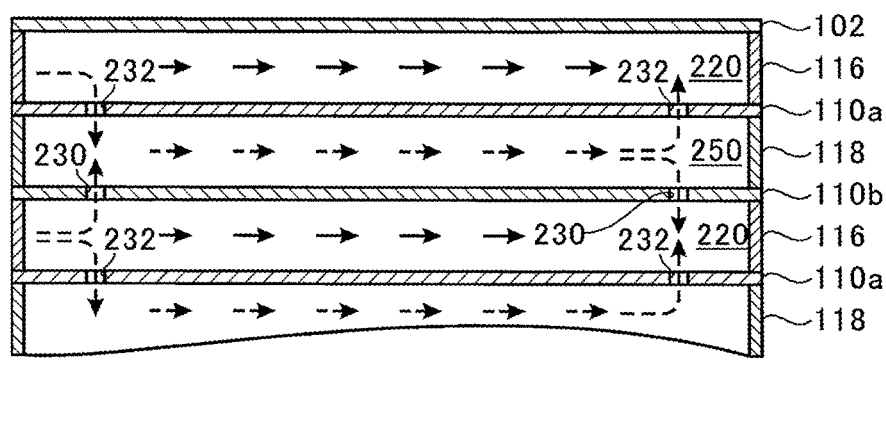
FIG. 4 is an explanatory view of a circulation mechanism of a heat medium in a suppression flow passage.
Figure 4:
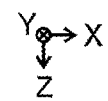

FIG. 4 is a partial sectional view (with respect to XZ sectional view) showing an area of the communication parts 230 and 232 of the reactor 100 for explaining the heat medium circulation mechanism in the suppression flow passage 250. As described above, the communication parts 230 are formed in the part of the heat transfer partition 110$b$ corresponding to the suppression flow passage 250. The communication parts 232 are formed in the heat transfer partition 110$a$ corresponding to the upper surface of the suppression flow passage 250 upon stacking.

Therefore, the heat medium introduced into the heat medium side flow passage 220 from the heat medium introduction member 130 flows through the heat medium side flow passage 220 as indicated by solid arrows in FIG. 4. Further, referring to dashed arrows in FIG. 4, the heat medium is introduced into the suppression flow passage 250 formed above the heat transfer partition 110$b$ through the communication part 230, and introduced into the suppression flow passage 250 formed below the heat transfer partition 110a through the communication parts 232. Then, the heat medium that has flowed through the suppression flow passage 250 is returned to the heat medium side flow passages 220 via the communication parts 230 and 232.

The communication parts 230 and 232 serve to allow the heat medium to flow through the suppression flow passages 250 without providing additional structures.

Further, there may be the case of the defect generated in the joined part owing to the thermal stress in the case where the temperature suitable for the reaction is high (500° C. or higher, for example). For example, if the defect is generated in the joined part with the side wall 114 of the reactor 10 as the comparative example shown in FIG. 3A, outflow of the reaction fluid to the outside may occur, resulting in the risk of deteriorated reaction efficiency. However, in this embodiment, the heat medium rather than the reaction fluid flows through the flow passage (suppression flow passage 250) which is exposed to the outside via the side wall 114. Even if the defect is generated, the structure according to the embodiment is capable of avoiding the outflow of the reaction fluid. This makes it possible to prevent deterioration in the reaction efficiency.

Furthermore, even in the case where any one of or both of the reaction fluid and the reaction product as expressed by the chemical formulae (1) to (5) is combustible gas or toxic gas, outflow of the reaction fluid may be prevented to ensure safety of the working environment without providing additional structures.

As described above, the reactor 100 according to this embodiment is configured to dispose the suppression flow passage 250 adjacent to the surface of the reaction side flow passage 210, on which no flowing passages are stacked (Z-axis direction in the drawing). It is therefore possible to improve the reaction efficiency by suppressing heat dissipation to the outside from the reaction side flow passage 210, or the heat inflow to the reaction side flow passage 210 from the outside.

The embodiment according to the present disclosure has been described above referring to the drawings. Obviously, however, the present disclosure is not limited to the above-described embodiment. The person skilled in the art will clearly understand that variations and modifications of the present disclosure may be made within the category described in the claims, and they naturally belong to the technical scope of the present disclosure.

For example, this embodiment is configured to have two respective communication parts 230 and 232 formed in the single heat transfer partition 110. However, the number of the communication parts 230 and 232 or shapes thereof is not limited to those described above so long as the heat medium is allowed to be introduced into the suppression flow passage 250, or discharged therefrom through the communication parts 230 and 232.

Further, this embodiment is configured to have the communication parts 230 and 232 formed in the reactor 100. However, the communication parts 230 and 232 may be omitted so long as the heat medium is allowed to flow through the suppression flow passage 250. For example, it is possible to provide the pipe (not shown) configured to communicate the suppression flow passage 250 with the heat medium side flow passage 220 via the side bar 116 and the bulkhead 118.

Furthermore, this embodiment is configured to allow the heat medium to flow through the suppression flow passage 250. However, any kind of fluid (suppression fluid) may be allowed to flow through the suppression flow passage 250 without being limited to the heat medium flowing through the heat medium side flow passage 220 so long as such fluid suppresses heat dissipation from the reaction fluid flowing through the reaction side flow passage 210 to the outside, or heat transfer from the outside to the reaction fluid.

Moreover, this embodiment is configured to suppress excessive heating (or cooling) of the partition flow passages 212A and 212E each adjacent to the suppression flow passage 250 without disposing the offset fin 300 on the suppression flow passage 250. However, it is possible to dispose the offset fin 300 on the suppression flow passage 250.

In addition, this embodiment is configured to partition the reaction side flow passage 210 into partition flow passages 212. However, the reaction side flow passage 210 does not have to be partitioned into the partition flow passages 212. That is, it is possible to omit the ribs 112 in the reaction side flow passage 210. Further, this embodiment is configured to partition the heat medium side flow passage 220 into the partition flow passages 222. However, the heat medium side flow passage 220 does not have to be partitioned into the partition flow passages 222. In other words, it is possible to omit the ribs 112 in the heat medium side flow passage 220.

Additionally, this embodiment is configured to allow the reaction fluid flowing through the reaction side flow passage 210 and the heat medium flowing through the heat medium side flow passage 220 to flow as countercurrents. However, the reaction fluid and the heat medium are allowed to flow in a direction parallel with each other (that is, the reaction fluid and the heat medium flow in the same direction).

Further, the heat medium flowing through the heat medium side flow passage 220 may be in the gaseous state (for example, combustion exhaust gas), or in the liquid state. However, the heat medium in the gaseous state may be handled easier than the case of using the heat medium in the liquid state.

What is claimed is:

1. A reactor comprising:
   a plurality of heat transfer partitions;
   a plurality of reaction side flow passages through which flows a reaction fluid that is a fluid to be a reaction object;
   a catalyst disposed inside the reaction side flow passage to accelerate reaction of the reaction fluid;
   a plurality of heat medium side flow passages which are alternately stacked with the reaction side flow passages via corresponding one of the plurality of heat transfer partitions and through which flows a heat medium that is a fluid performing heat exchange with the reaction fluid flowing through the reaction side flow passage; and
   a suppression flow passage through which flows a suppression fluid that is a fluid suppressing heat dissipation from the reaction fluid flowing through the reaction side flow passage to the outside, or heat transfer from the outside to the reaction fluid;
   wherein a group of the reaction side flow passages has a surface on which the heat medium side flow passages are not stacked, and
   wherein the suppression flow passage is disposed adjacent to the surface of the group of the reaction side flow passages.

2. The reactor according to claim 1, wherein the heat medium flows, as the suppression fluid, through the suppression flow passage.

3. The reactor according to claim 2, wherein
   each of the plurality of heat transfer partitions includes a communication part which allows the heat medium side flow passage and the suppression flow passage to communicate with each other, and the heat medium is introduced into the suppression flow passage from the heat medium side flow passage through the communication part.

4. The reactor according to claim 1, wherein the suppression flow passage is located on each side of the group of the reaction side flow passages in an arrangement direction of the reaction side flow passages.

5. The reactor according to claim 2, wherein the suppression flow passage is located on each side of the group of the reaction side flow passages in an arrangement direction of the reaction side flow passages.

6. The reactor according to claim 3, wherein the suppression flow passage is located on each side of the group of the reaction side flow passages in an arrangement direction of the reaction side flow passages.

7. The reactor according to claim 1, wherein the plurality of heat medium side flow passages and the suppression flow passage are provided on each of the plurality of heat transfer partitions.

8. The reactor according to claim 1, wherein the plurality of heat medium side flow passages, the plurality of reaction side flow passages, and the suppression flow passage are provided mutually in parallel.

\* \* \* \* \*